(12) United States Patent
Timmins et al.

(10) Patent No.: US 8,081,742 B2
(45) Date of Patent: *Dec. 20, 2011

(54) TECHNIQUE FOR EFFECTIVELY PROVIDING A PERSONALIZED INFORMATION ASSISTANCE SERVICE

(75) Inventors: Timothy A. Timmins, Tigard, OR (US); John S. Miller, Canby, OR (US); Nathan B. Baker, Tigard, OR (US)

(73) Assignee: Grape Technology Group, Inc., Bethlehem, PA (US)

(*) Notice: Subject to any disclaimer, the term of this patent is extended or adjusted under 35 U.S.C. 154(b) by 411 days.

This patent is subject to a terminal disclaimer.

(21) Appl. No.: 12/287,146

(22) Filed: Oct. 6, 2008

(65) Prior Publication Data

US 2009/0110178 A1    Apr. 30, 2009

Related U.S. Application Data

(63) Continuation of application No. 10/323,287, filed on Dec. 19, 2002, now Pat. No. 7,466,805, which is a continuation-in-part of application No. 09/865,230, filed on May 25, 2001, now abandoned.

(51) Int. Cl.
*H04M 15/00* (2006.01)
(52) U.S. Cl. .......... 379/114.13; 379/218.01; 379/218.02
(58) Field of Classification Search ............. 379/114.13, 379/218.01, 218.02
See application file for complete search history.

(56) References Cited

U.S. PATENT DOCUMENTS

| | | | |
|---|---|---|---|
| 4,551,581 A | 11/1985 | Doughty | |
| 4,582,956 A | 4/1986 | Doughty | |
| 4,850,007 A | 7/1989 | Marino et al. | |
| 5,642,407 A | 6/1997 | He | |
| 5,652,789 A | 7/1997 | Miner et al. | |
| 5,675,637 A | 10/1997 | Szlam et al. | |
| 5,689,547 A | 11/1997 | Molne | |
| 5,742,769 A | 4/1998 | Lee et al. | |
| 5,873,032 A | 2/1999 | Cox et al. | |
| 5,933,778 A | 8/1999 | Burhrmann et al. | |
| 5,943,417 A | 8/1999 | Cox et al. | |
| 5,953,393 A | 9/1999 | Culbreth et al. | |
| 5,966,437 A | 10/1999 | Cox et al. | |
| 6,035,190 A | 3/2000 | Cox et al. | |
| 6,055,513 A | 4/2000 | Katz et al. | |
| 6,065,016 A | 5/2000 | Stuntebeck et al. | |
| 6,170,011 B1 | 1/2001 | Macleod Beck et al. | |
| 6,208,975 B1 | 3/2001 | Bull et al. | |
| 6,381,640 B1 | 4/2002 | Beck et al. | |
| 6,697,632 B1 | 2/2004 | Sood | |
| 6,731,927 B1 | 5/2004 | Stern et al. | |
| 6,788,769 B1 | 9/2004 | Waites | |
| 6,829,475 B1 | 12/2004 | Lee et al. | |
| 6,870,921 B1 | 3/2005 | Elsey et al. | |
| 6,885,736 B2 | 4/2005 | Uppaluru | |
| 6,944,273 B2 | 9/2005 | Huna | |
| 6,961,712 B1 | 11/2005 | Pekowski | |
| 6,964,012 B1 | 11/2005 | Zirngibl et al. | |

(Continued)

*Primary Examiner* — Simon Sing
(74) *Attorney, Agent, or Firm* — Sofer & Haroun, LLP

(57) ABSTRACT

A user may utilize a communication device, e.g., a wireless phone, mobile device or personal digital assistant (PDA), to contact an information/call center where an operator provides personalized information and communications services to the user in accordance with the invention. Such services include, e.g., providing individual listing information items on a restrictive basis, caller identification service, etc. To personalize the services, at least one profile record associated with the user is used which specifies the subscribed services and the preferred ways of receiving information. For example, the profile may specify use of a special skilled operator, personal interests, methods of delivery of targeted information to the user, etc.

15 Claims, 10 Drawing Sheets

U.S. PATENT DOCUMENTS

| | | |
|---|---|---|
| 6,965,868 B1 | 11/2005 | Bednarek |
| 6,996,531 B2 | 2/2006 | Korall et al. |
| 7,013,290 B2 | 3/2006 | Ananian |
| 7,031,438 B1 | 4/2006 | Cheston et al. |
| 7,072,870 B2 | 7/2006 | Tallent et al. |
| 2001/0049617 A1 | 12/2001 | Berenson et al. |
| 2002/0032589 A1 | 3/2002 | Shah |
| 2002/0035605 A1 | 3/2002 | Mc Dowell et al. |
| 2002/0055351 A1 | 5/2002 | Elsey et al. |
| 2003/0041068 A1 | 2/2003 | Camarillo |
| 2004/0064363 A1 | 4/2004 | Mostad et al. |
| 2004/0223593 A1 | 11/2004 | Timmins et al. |

CALL HANDLING PREFERENCES

- 514 — DR. SMITH      ☐ TEMPORARY
- 516 — NEW YORK, NY      ☐ TEMPORARY

SERVICE PREFERENCES

- 512 — ☑ PERSONALIZED INFORMATION MANAGEMENT SERVICE
- 520 — ☐ CALLER-ID SERVICE

PERSONAL INTERESTS — 540

MUSIC: BEATLES, ROLLING STONES, ...
FASHION: VERSACE, DONNA KAREN, ...
SPORTS
EVENTS: KNICKS BASKETBALL GAMES, PGA GOLF TOURNAMENTS, ...

INFORMATION DELIVERY METHOD PREFERENCES — 550

VOICE MAIL 555-432-1012
WAP SITE WAP411.COM/USR

DICTIONARY — 560

565

| CUSTOMIZED COMMAND | MENU COMMAND |
|---|---|
| "O" KEY | "*" KEY |
| "NUMBER PLEASE" | "#" KEY |
| ⋮ | ⋮ |

FIG. 8

| NAME | HOME | BUSINESS | MOBILE | | |
|------|------|----------|--------|------|------|
| BOB | 709-166-5555 | 555-444-3333 | 709-123-4567 | MORE | EDIT |
| MARY LAMB | 709-133-2977 | 555-222-7777 | 709-890-1234 | MORE | EDIT |
| BAT MAN | 555-666-0000 | 646-111-0000 | 646-555-6789 | MORE | EDIT |

FIG. 9

| FIRST NAME | MIDDLE NAME | LAST NAME |
|------------|-------------|-----------|
| BOB | | |

| | | | | |
|---|---|---|---|---|
| COMPANY NAME | ABC CORPORATION | ADDRESS | | |
| DEPARTMENT | SALES | CITY | | |
| TITLE | MANAGER | STATE | | |

| | | | |
|---|---|---|---|
| HOME | 709 166 5555 | PRIVATE | ☒ — 807 |
| WIRELESS | 709 123 4567 | PRIVATE | ☐ — 809 |
| BUSINESS | 555 444 3333 | PRIVATE | ☐ |
| FACSIMILE | | PRIVATE | ☐ |
| EMAIL | | PRIVATE | ☐ |
| PAGER | | PRIVATE | ☐ |

SAVE  CANCEL

*FIG. 10*
| NAME | HOME | BUSINESS | MOBILE | |
|---|---|---|---|---|
| BOB | PRIVATE | 555-444-3333 | 709-123-4567 | MORE |
| MARY LAMB | 709-133-2977 | 555-222-7777 | 709-890-1234 | MORE |
| BAT MAN | 555-666-0000 | 646-111-0000 | 646-555-6789 | MORE |
912
*FIG. 11*
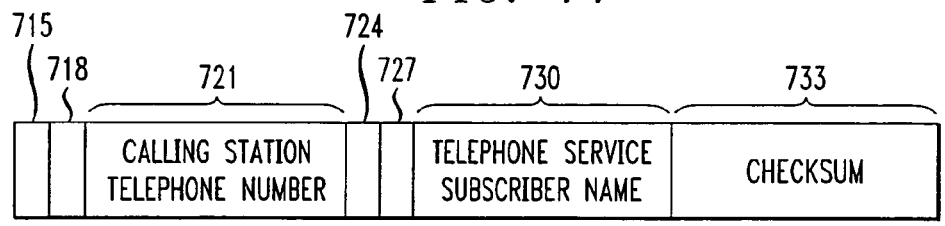
*FIG. 12*
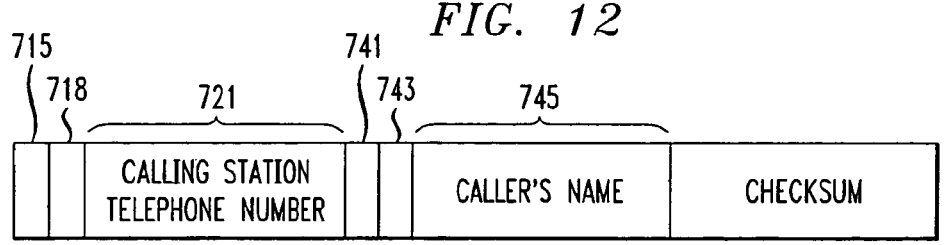
*FIG. 13*
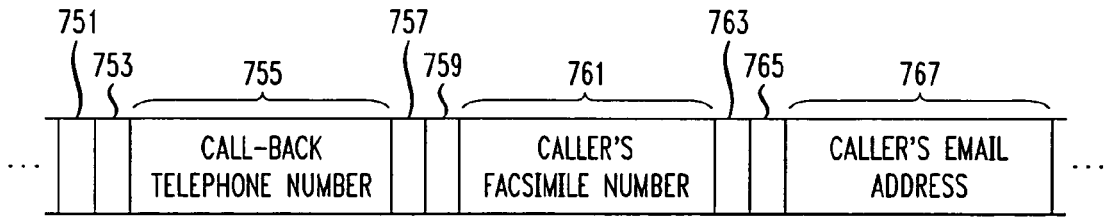
*FIG. 14*
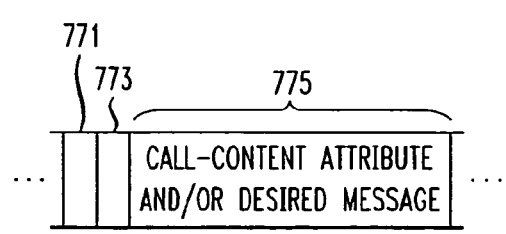

FIG. 15

TECHNIQUE FOR EFFECTIVELY PROVIDING A PERSONALIZED INFORMATION ASSISTANCE SERVICE

The present application is a continuation application of U.S. patent application Ser. No. 10/323,287, filed on Dec. 19, 2002 now U.S Pat. No. 7,466,805, which in turn is a continuation-in-part of application Ser. No. 09/865,230 filed on May 25, 2001 now abandoned, the entirety of which are incorporated by reference.

FIELD OF THE INVENTION

The invention relates to a communication system and method, and more particularly to a system and method for providing personalized information assistance and services.

BACKGROUND OF THE INVENTION

In this information age, people need to be well informed and organized to effectively carry out day-to-day activities, especially when they are traveling and away from their "home" base where they normally conduct their business. As a result, use of mobile devices which facilitate mobile communications such as personal digital assistants (PDAs), and wireless phones and devices is ubiquitous. For example, PDAs of the PALM type allow users to store and organize their appointments, to-do lists and contacts information. Some PDAs also allow the users to access the Internet to upload and download information, and communicate with other people and information sources via email.

Similarly, wireless phones conveniently allow users while traveling to call and communicate with other people. In case the users cannot remember the telephone number of a contact or it is not handy, or the users want to obtain directions and other information concerning, e.g., restaurants, theaters, etc., they can call operators for assistance. To that end, an expansive network of communication call centers has been established which provides users with nationwide assistance.

SUMMARY OF THE INVENTION

In order to effectively utilize the prior art operator assistance service needs to be improved and, more particularly, personalized to the extent comparable to the personal assistance afforded by a user's personal aide or secretary. Some desirable personalized information assistance service features have been described, e.g., in copending commonly assigned application Ser. No. 09/865,230 ("the '230 application") filed on May 25, 2001, hereby incorporated by reference. In particular, the '230 application discloses an information assistance service which as part of the service maintains, for the user, contacts folders (also known as private directories), appointments folders, to-do lists, etc. The user may access, through the information assistance service, contact information, appointment information or a to-do list item in the respective folders associated with the user. In particular, a contacts folder contains contact information, such as a telephone number(s), an address(es), and e-mail address(es), for people and/or organizations. A user may have separate contacts folders for different purposes, such as a personal contacts folder, business contacts folder, etc. An appointments folder contains a user's appointment and/or calendar information, and a user may similarly have separate appointments folders for different purposes.

In addition, the '230 application discloses that the information assistance service maintains one or more user profiles which include information pertaining to and about the user. The user may specify in a profile his/her preferred types of events, areas of interest, food, goods, services, manufacturers, merchants and other personal preferences, e.g., preferred music, fashion, sports, restaurants, seating on a plane, frequent flyer number, frequent stay number, sizes of jackets, etc. Such a profile may be used by a server to tailor the content of information delivered automatically to the user as soon as the information becomes available. The user may also specify in the profile the preferred method of handling his/her information assistance call, e.g., use of a special skilled operator, such as a Spanish speaking operator, to answer such a call. Thus, by using a profile, the user is automatically provided with a personalized service, without the need of otherwise repeating the preferences each time when calling an operator to obtain information and assistance.

The invention improves the above-described information assistance service in many ways. For example, when an information assistance call is received, along with an identifier (e.g., automatic number identifier (ANI)) identifying a communications device from which the call originates, whether user data (e.g., skilled operator preferences) associated with the identifier is maintained by the information assistance service system is determined, where the user data concerns a manner in which the call is to be handled. If the user data is not maintained by the information assistance service system, in accordance with an aspect of the invention the caller is asked to provide the user data, and the user data, thus provided, is stored associated with the identifier. The call is then handled based on such user data, In accordance with another aspect of the invention, listing information items (home phone number, business phone number, wireless phone number, etc.) in a directory (e.g., contacts folders, public telephone directory, wireless telephone directory, enterprise directory, etc.) may be kept from disclosure on an item by item basis. In other words, in accordance with the invention, a directory database is maintained, allowing one or more of the information items in a listing to be restricted from disclosure on an individual information item basis. Thus, the information assistance service discloses, to an information assistance caller, only those selected information items in the listing which are unrestricted from disclosure to the caller.

In addition, at an appropriate stage of an information assistance call, e.g., at the closing of the call, a voice server in an information assistance service provider may seize the caller's connection, and inform the caller of service features which are available for incorporation into the current information assistance service. Thus, in accordance with yet another feature of the invention, after connecting the information assistance call to a desired destination number, the status of the call (e.g., call completion, ring-no-answer, busy, communication problem, etc.) is monitored. The voice server may provide a description of service feature(s) to the caller after one such status is determined. The user is then allowed to modify the service to incorporate the service feature(s) during the call.

For example, the incorporation of the service feature(s) may be accomplished by key or voice command. In accordance with still yet another aspect of the invention, the user is allowed to customize, and thereby reconfigure, menu commands or other available command sets. Thus, even though the information assistance service system is configured to carry out an action in response to a first command, the system components during the information assistance call monitors for a second command which relates to the first command pursuant to a "dictionary," including command reconfiguration data associated with, and maintained for, the caller. The action is carried out when the second command is initiated by the caller.

We have recognized that based on user profile information, the user may be targeted to receive certain advertising or promotional information. For example, before or after an information assistance call, such targeted promotional information may be "pushed" to the user, subject to any requirements in the profile. Alternatively, the inventive service may leave the user a message (e.g., voicemail, e-mail, etc.) containing the targeted promotional information at an address (e.g., voicemail access number, e-mail address, etc.) provided in the user profile, or may provide the user with information concerning an access to the same (e.g., WAP or web access with a specified uniform resource locator (URL)) on, say, the user's bill for the information assistance service, etc.

Thus, for example, in accordance with a further aspect of the invention, preference data associated with a user is maintained, and information having content in accordance with the preference data is selected to target the user. After connecting an information assistance call from the user to a desired destination number, the status of the call (e.g., call completion, ring-no-answer, busy, communication problem, etc.) is monitored. The voice server may provide the selected, targeted information to the user after one such status is determined. It should be noted that the user may also be allowed to opt out one or more of the above targeted advertising service features.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 5 illustrates a user profile record in accordance with the invention.

FIG. 8 illustrates an Edit GUI in accordance with the invention;

FIG. 9 illustrates a GUI containing contact information in accordance with the invention;

FIG. 10 illustrates a View GUI in accordance with the invention;

FIG. 11 illustrates a first example of caller identification (CID) data to be transmitted to a called station in accordance with the invention;

FIG. 12 illustrates a second example of CID data to be transmitted to a called station in accordance with the invention;

FIG. 13 illustrates a third example of CID data to be transmitted to a called station in accordance with the invention;

FIG. 14 illustrates a fourth example of CID data to be transmitted to a called station in accordance with the invention;

FIG. 15 illustrates a GUI particularly useful for an operator to search for directory information concerning a desired party in accordance with the invention.

DETAILED DESCRIPTION

Figure 1:
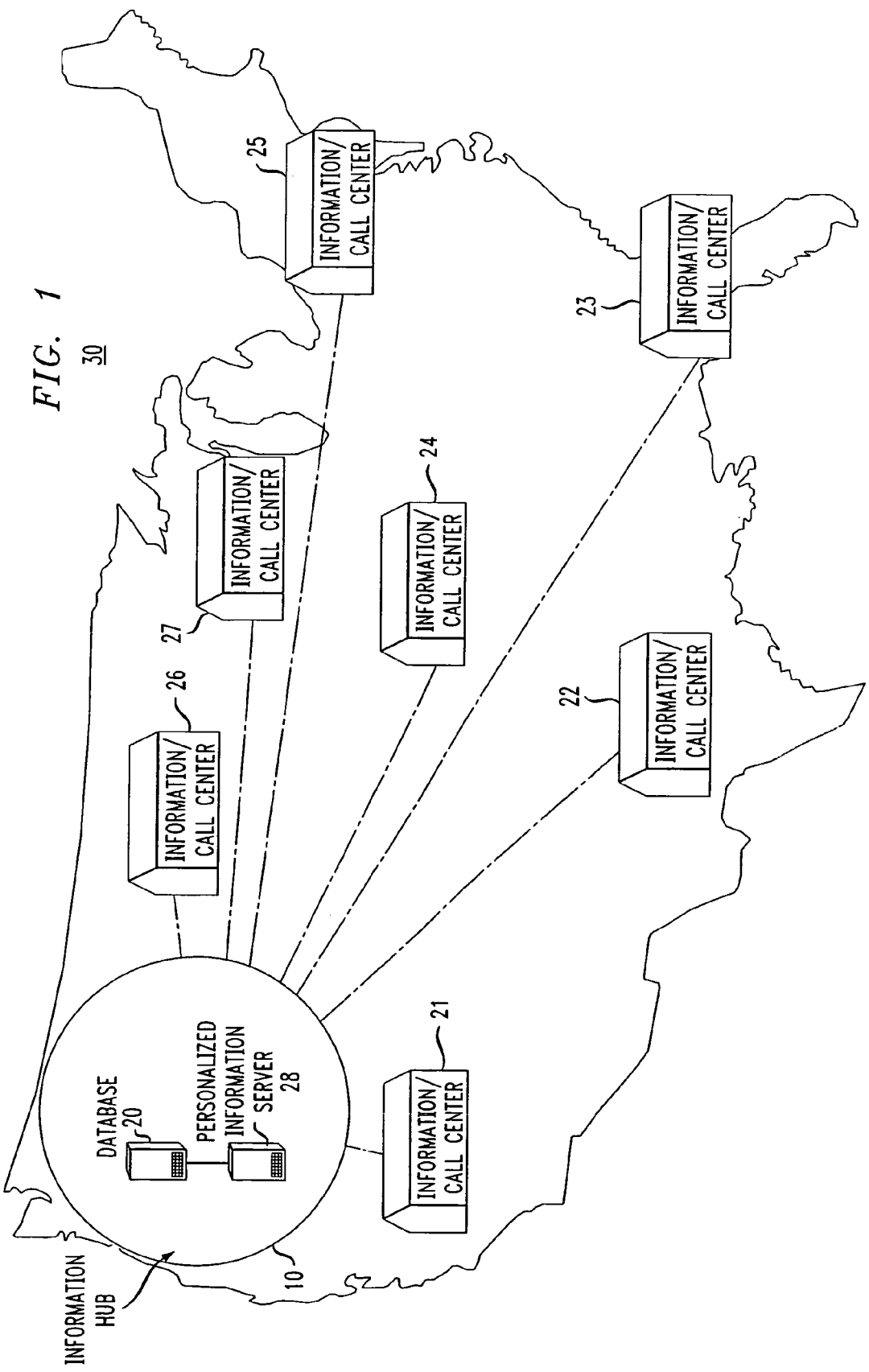
FIG. 1 illustrates a communications system including information/call centers in accordance with the invention.

The invention is directed to providing personalized information and communications services to users, e.g., telephone and mobile device users, especially when they are away from their "home" base where they normally conduct their business. An objective of the invention is to provide the users with personalized services comparable to those which are offered by the users' personal aides or secretaries. To that end, an information assistance service in accordance with the invention utilizes such information management tools as contacts folders (also known as private directories), appointments folders, to-do lists, user profiles, etc. to effectively communicate dynamic information to the users. The information assistance service in question provides not only traditional directory assistance, but also concierge-type services such as a restaurant guide and reservation service, event ticketing and reservation service, hotel reservation and availability service, travel or flight reservation and ticketing service, ordering specific items such as flowers or food delivery, arranging transportation, and accessing entertainment guides; geo/direction services such as providing directions to various places; sending invitations; administering appointments calendars; and conducting other transactions for the users.

To facilitate tailoring the information assistance service to individuals' specifications, one or more user profiles are maintained for a user, based on which the service is rendered to the user. For example, a user profile may specify the preferred method of handling his/her information assistance call, e.g., use of a special skilled operator, such as a Spanish speaking operator, to answer one such call. It may also define options of various assistance service features, e.g., the methods of delivery (e.g., e-mail, paging, SMS, etc.) of a confirmation of a reservation or purchase, a listing number, directions to the user, etc. The user profile may further specify the user's preferred types of events, areas of interest, food, goods, services, manufacturers, merchants and other personal preferences, e.g., preferred music, fashion, sports, restaurants, seating on a plane, sizes of jackets, etc. We have recognized that based on such user profile information, the user may be targeted to receive certain advertising or promotional information. For example, before or after an information assistance call, such targeted promotional information may be "pushed" to the user, subject to any requirements in the profile. Alternatively, the inventive service may leave the user a message (e.g., voicemail, e-mail, etc.) containing the targeted promotional information at an address (e.g., voicemail access number, e-mail address, etc.) provided in the user profile, or may provide the user with information concerning an access to the same (e.g., WAP or web access with a specified uniform resource locator (URL)) on, say, the user's bill for the information assistance service. Of course, the user is allowed to opt out one or more of the above targeted advertising service features.

It should be noted that the preferences in a profile may vary with time, and may be adjustable depending on different conditions. For example, preferences applicable to the day time may be turned off in the evening, at which time another set of preferences may control. Similarly, preferences applicable to weekdays may be turned off on weekends in favor of a second set of preferences selected for weekends. Thus, by using the profile, the user is automatically provided with a personalized service, without the need of otherwise repeating the preferences, e.g., each time when calling an operator to obtain information and assistance. It should be pointed out that the term "operator" used herein broadly encompasses entities that are capable of providing assistance in a telecommunication environment, including without limitation human operators, voice response/recognition capabilities, web-enabled operator services, and other automated and electronic access.

For example, a user profile(s) in this instance may be maintained by the inventive information assistance service in association with an identifier of the user, e.g., the user's telephone number. When an information assistance call is received, the subject service locates any profiles of the caller's, e.g., based on an automatic number identification (ANI) associated with the call, which in a well known manner identifies the telephone number of the communications device from which the call originates. In an alternative embodiment, the caller's profile(s) may be determined by recognizing and identifying the caller's voice, with his/her "voice prints" stored in association with the profile(s). In accordance with an aspect of the invention, if no such profile can be located or no preferred call handling method is specified in his/her profile, the caller is automatically afforded an opportunity to create one such profile or specify his/her preferred call handling method for the present call and/or future calls. To that end, the caller may be afforded a menu to answer a series of questions, or select a series of options on the fly. The answers or selections may be stored to become part of the caller's profile. Of course, the service also allows the caller to create or revisit his/her profile at anytime, whether online or offline, to add, delete or otherwise modify the preferences therein.

Another opportune time for prompting a caller to modify his/her profile may be at the closing of an information assistance call. At such time, the user may also be allowed to order additional service features or request other actions. For example, a voice server (e.g., a voice response unit (VRU)) employed by the inventive information assistance service may inform the caller that a new enhanced service feature has been deployed and is available to the user, and prompt the user to press "1" if he/she wants to adopt the new service feature. In addition, for example, when the inventive service has looked up, for the caller, a listing in a public directory, the caller may be prompted to press "8" to incorporate that listing information in an appropriate contacts folder associated with the caller. In general, the voice server may present any applicable service options at appropriate stages of the call, allowing the caller to exercise the service options by key command or voice command, or with the help of an operator.

In addition, in accordance with another aspect of the invention, the user may create his/her "dictionary" for configuring or customizing, e.g., key/voice commands in interacting with the inventive information assistance service. Such a dictionary may be made part of the user profile as well.

In yet another embodiment of the invention, past actions of the caller stored from previous calls may be referred to in order to develop and modify, on the fly, a "trended" or "moving average" set of preferences for call handling. This may even be used, for example, to direct inbound calls to the most local or otherwise most appropriate call center for service. For example, eight of last ten calls terminated in Colorado; the next call may be automatically re-directed to the Denver call center.

FIG. 1 illustrates a communications system embodying the principles of the invention for providing, inter alia, a personalized information assistance service. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. One or more information hubs 10 are also included in WAN 30. An information hub 10 includes one or more personalized information servers 28 which are accessible by the operators in the system, and one or more databases 20 in which subscribers' information, and contacts, appointments, and other folders (e.g., to-do lists) may be stored and maintained. Such information and folders may also be stored locally at one or more of the information/call centers.

A user of the personalized information assistance service may want to create multiple contacts folders for different purposes. For example, they may include a personal contacts folder containing personal directory information, and a business contacts folder containing business directory information. With the personalized information service, a contacts folder may be created and maintained (1) through the Internet or other network or communications means directly, (2) through an operator indirectly, and/or (3) using a personal information manager (PIM). Well known PIMs include, e.g., hand-held devices such as personal digital assistants (PDAs) and wireless communicators; and computer devices such as notebook, laptop and desktop computers running software applications such as Microsoft Outlook, Outlook Express, Goldmine, Symantec Act!, Lotus Organizer and Lotus Notes. Other PIMs may include proprietary PIM systems and applications.

In case (3), by running a synchronization engine, the user may update any directory information which has been changed (added, edited or deleted) in a PIM data source in the corresponding contacts folder, and vice versa. In case (2), the user may access a contacts folder through communications with an operator at an information/call center via telecommunication media, e.g., wireless telephone, wireline telephone, voice over Internet protocol (VoIP), PDA, VPN, etc. The operator, as explained in more detail below, is generally provided with web browsing capabilities, telephone facilities as well as fully-featured operator user interface applications which facilitate the searching, retrieval and administering of database 20 through server 28.

Figure 2A:
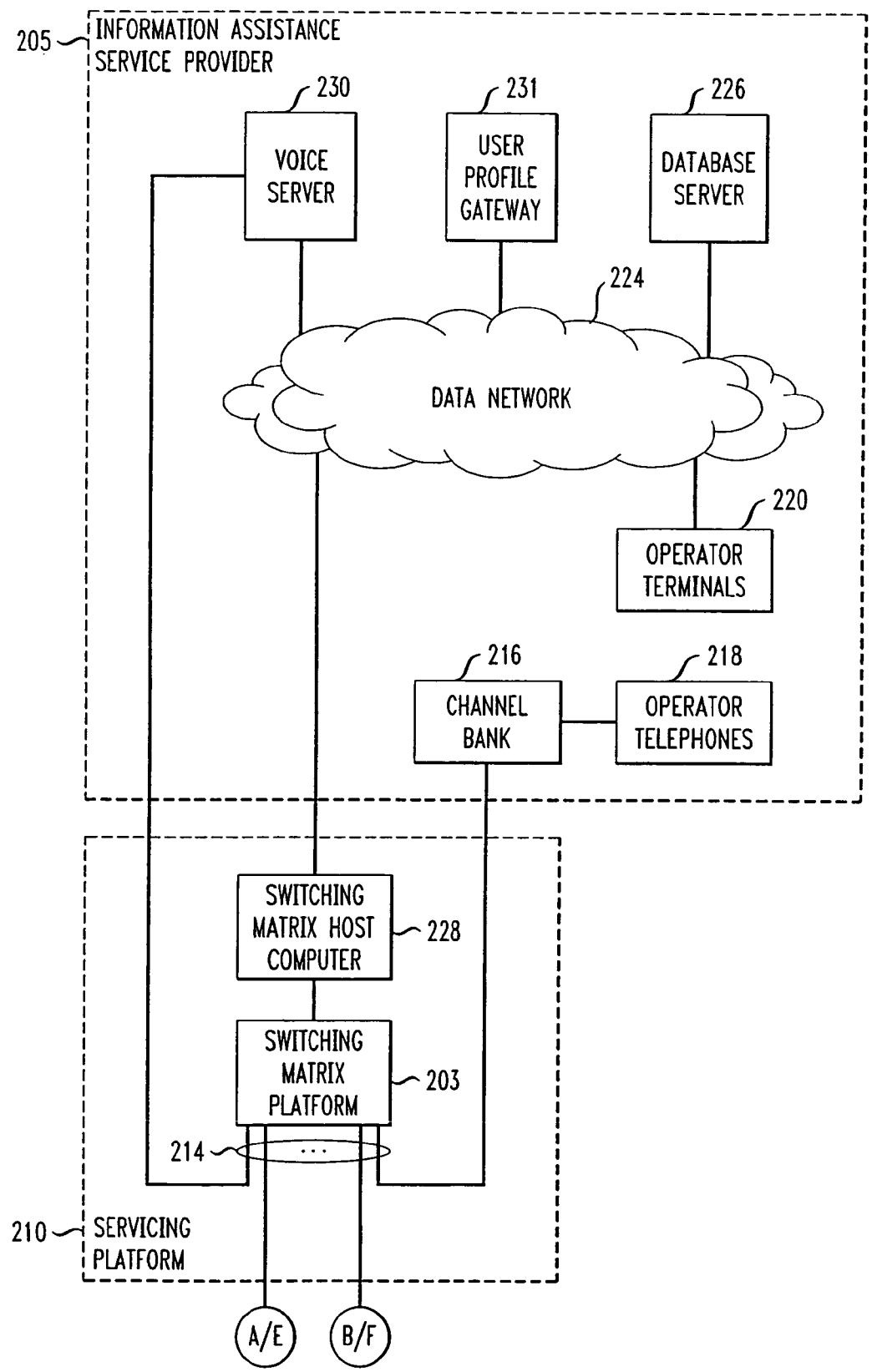
FIGS. 2A and 2B are block diagrams of components of the communications system of FIG. 1.
Figure 2B:
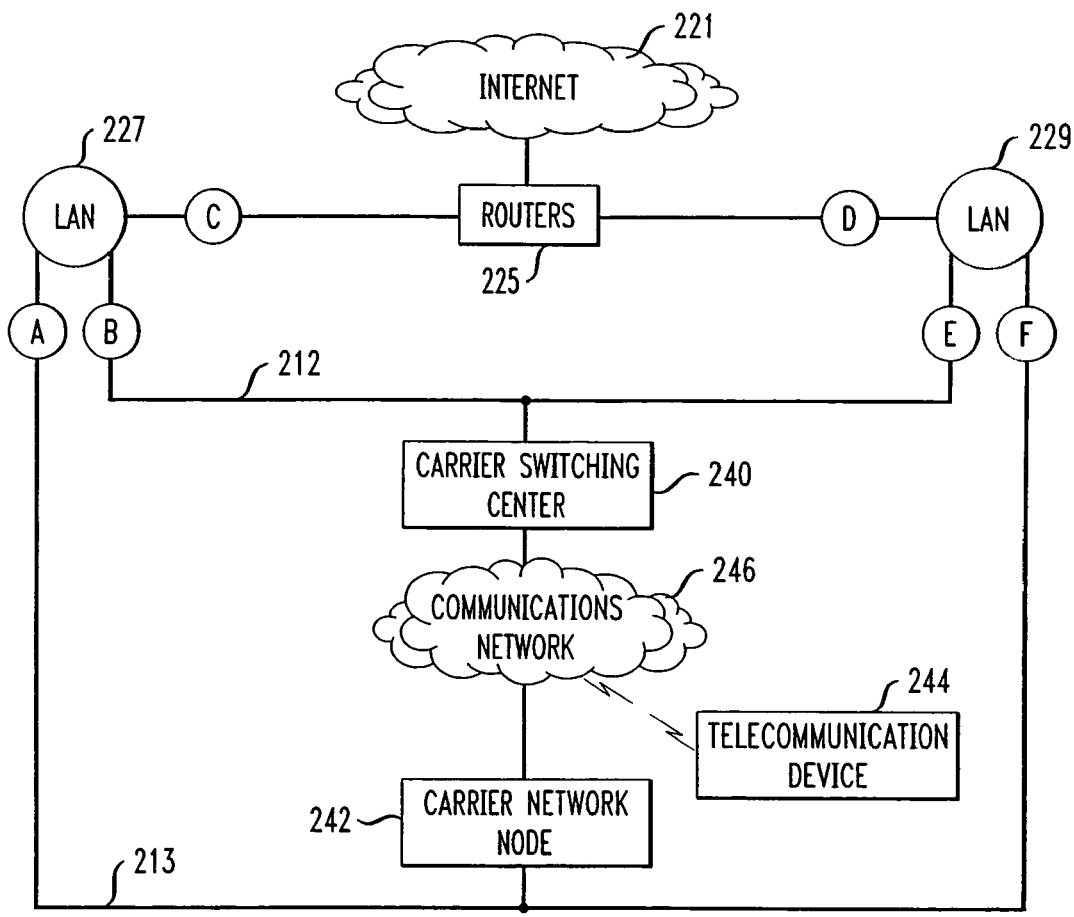

Referring to FIGS. 2A and 2B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 126 provides access to, among others, directory information from multiple sources. Database server 226 enables the operator to search directory information not just by name and address (sometimes city or area code) of a desired party, but also by type of goods/services and/or geographical region of a desired entity.

Data network 224 further connects to voice server 230, user profile gateway 231, and switching matrix host computer 228, which in turn is connected to switching matrix platform 203 via a data link. Data network 224 includes, but is not limited to, local area network (LAN) 227, best seen in FIG. 2B. LAN 227 may connect to other similar remote LANs 229 to form WAN 30 in FIG. 1. LANs 227 and 229 are connected to one another and to Internet 221 via routers 225.

A user's telephone, computer, PDA or other telecommunication device 244 communicates via communications network 246 which is connected to carrier network node 242 and carrier switching center 240. T1 voice links 212 provide connection between the information/call-center's switching matrix platform 203 and carrier's switching center 240, through which incoming information service calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component. If the outgoing call is being placed over a different network than that on which the incoming call was received, a second data connection to the outgoing network will be established. The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on center 200 and platform 203 for each corresponding function.

Voice server 230 is connected via data network 224 to computer 228 (to which it acts as a slave processor) and via one or more T1 links to switching matrix platform 203. Each voice server 230 when more than one is employed in information/call center 200, connects to switching matrix platform 203 via a separate T1 link. Voice server 230 comprises a general purpose computer incorporating one or more voice cards, which serve as the interface between server 230 and the T1 span to switching matrix platform 203. One such voice card in server 230 monitors and controls communications over the T1 span. Its capabilities include telephone tone (e.g., DTMF or MF) detection and generation, voice recording and playback, and call progress analysis. Voice server 230 in this instance also contains a voice recognition device for receiving verbal input from a party connected thereto. Voice server 230 is employed to play the constantly repeated parts of an operator's speech, namely, the various greetings and signoffs (or closings), the caller's desired telephone number where requested, and possibly other information. At appropriate stages in a call progression, switch matrix host computer 228 initiates a voice path connection between voice server 30 and switching matrix platform 203 such that the user, or the user and the operator, are able to hear whatever pre-recorded speech is played on that connection by voice server 230. Computer 228 then instructs voice server 230, via data network 224, what type of message to play, and passes data parameters that enable voice server 230 to locate the message appropriate to the call state.

Users of a particular telephone carrier may dial, speak or otherwise communicate predetermined access digits, access codes or retail numbers, or input a predetermined address or a URL established for information assistance by that company. The instant example assumes that the user dials, e.g., "411," "*555," "555-1212," "1-800-555-1212," "00," or other designated access numbers. The participating telephone company's own switching system will then reroute the call to information/call center 200 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes are utilized, such as skills-based routing based on, e.g., a preferred call handling method specified by a user profile, or a priority scheme for preferred callers. The queue is maintained by switching matrix host computer 228.

As mentioned before, a user may create, maintain or access one or more contacts folders (or other folders such as a personal or company calendar folders) via the Internet or other network or communications means, or through an operator who in turn may create, maintain or access the folder on behalf of the user. In this illustrative embodiment, two contacts folders associated with the user, e.g., "My Contacts" and "Company Contacts" folders, are maintained and stored in database 20.

When the user uses telecommunication device 244, e.g., a wireless telephone, to call an operator at a designated access number for information assistance, the call is routed to, say, information/call center 200. After receiving the call, center 200 checks any user profile record associated with the user. In general, a user profile record is identified by a user's telephone number and maintained by a profile manager described below. Referring back to FIG. 2A, an information assistance call is received by switching matrix platform 203 in center 200. In a well known manner, platform 203 derives, from the call set-up signals associated with the call, an automatic number identification (ANI) indicating the telephone number of the communication device from which the call originates. Switching matrix host computer 228 then requests any user profile record identified by such an ANI from gateway 231 connected to data network 224.

Figure 3:
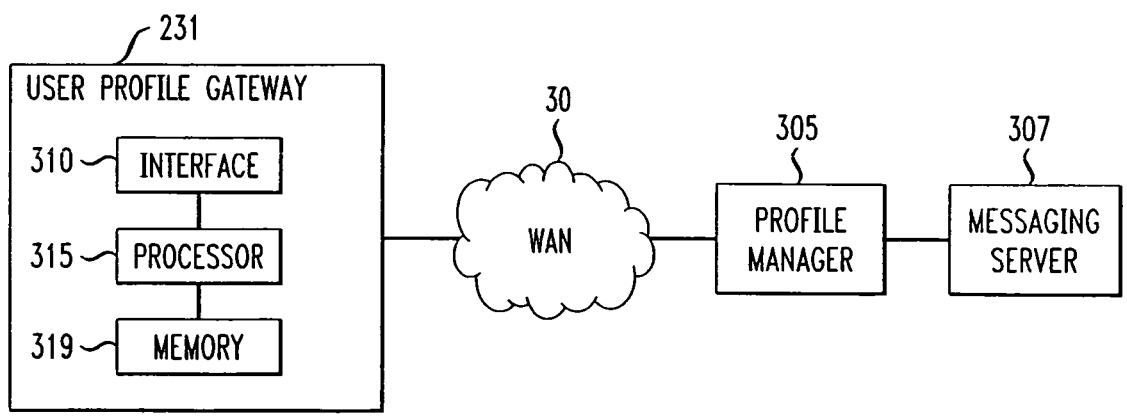
FIG. 3 illustrates an arrangement whereby an information/call center obtains a user profile record.

Referring also to FIG. 3, gateway 231 receives the profile record request including the ANI from data network 224 through interface 310. In response to such a request, processor 315 searches memory 319 for the profile record identified by the ANI. It should be noted at this point that all profile data is input and updated through profile manager 305. Copies of the profile records are distributed by manager 305 to the profile gateways in various information/call centers through WAN 30. In this illustrative embodiment, a master copy of the profile records is kept at manager 305. For example, profile gateway 231 initially forwards requests for new profile records to manager 305, and caches copies of the requested profile records from manager 305 in local memory 319 for rapid, subsequent retrieval of the profile records. Memory 319 here generically includes disks, caches, and volatile and nonvolatile memories. When a particular profile record in gateway 231 is updated at manager 305, the latter notifies gateway 231 that the particular profile record has expired. Thus, continuing the above example, if processor 315 determines that the requested profile record cannot be found in memory 319 or the requested profile record has expired, processor 315 forwards the profile record request to manager 305 through interface 310. In response, manager 305 provides to gateway 231 any latest profile record identified by the ANI. Otherwise, processor 315 retrieves from memory 319 any available, unexpired profile record identified by the ANI.

In accordance with an aspect of the invention, if processor 315 finds no user profile record in memory 319 and the response to the profile record request from manager 305 is negative, processor 315 informs manager 305 of the "profileless" status of the user. Otherwise, if processor 315 locates the latest user profile record, processor 315 reads the profile record to determine whether data about selected aspects of the user preferences in the profile record is missing or deficient, e.g., the preferred method of handling the instant information assistance call. If so, processor 315 informs manager 305 of the "profile data deficient" status of the user.

Figure 4:
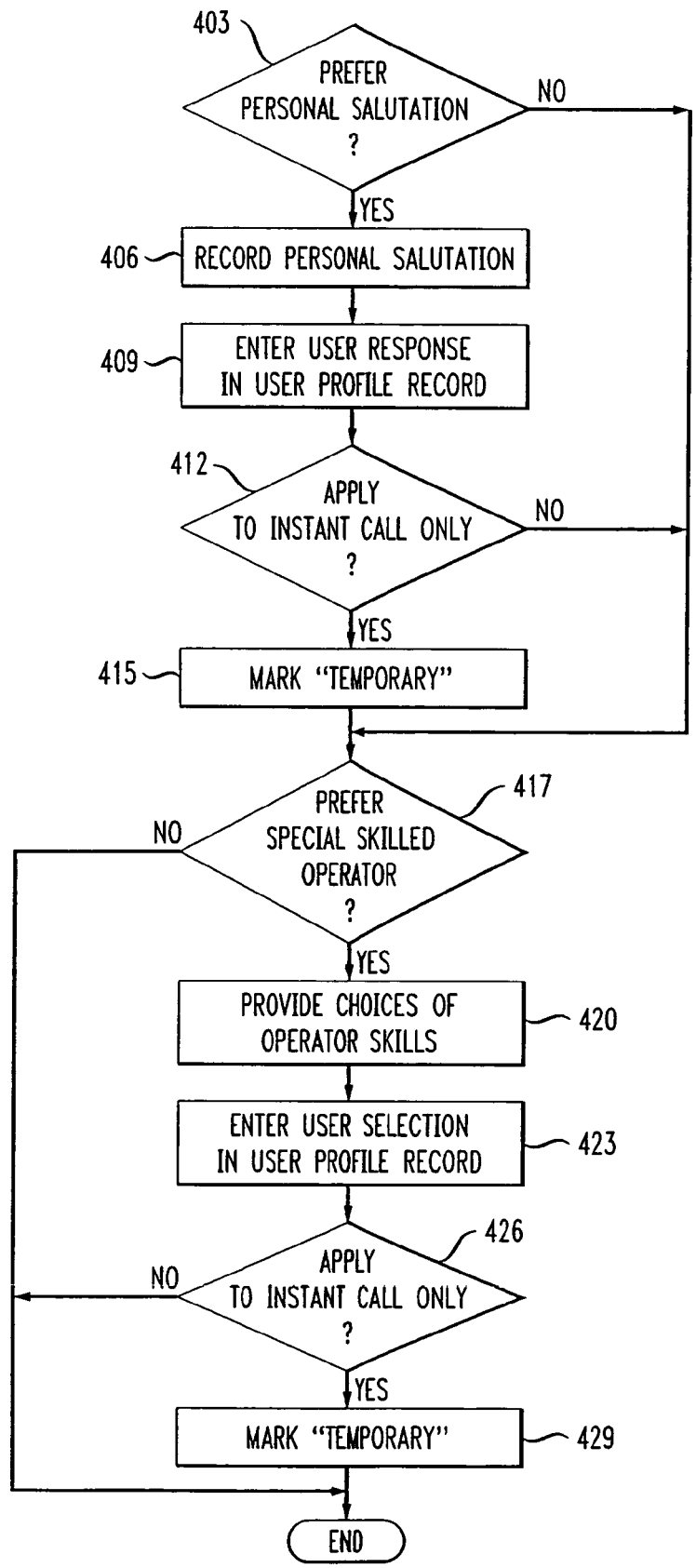
FIG. 4 is a flow chart depicting a routine for specifying user preferences concerning information assistance call handling, in accordance with the invention.

Upon learning either the "profileless" or "profile data deficient" status of the user, manager 305 causes voice server 230 to seize the instant information assistance call, and elicit from the user data about his/her preferences to establish the user profile record or to supplement the same. For example, an important aspect of the user profile is the preferred method of handling an information assistance call, which is missing in this instance. FIG. 4 illustrates a routine for eliciting from the user data concerning such a call handling method. before the instant call is handled by an operator. At step 403, server 230 asks the user whether he/she prefers a personal salutation, e.g., Mr. Jay Smith, Dr. Smith, Jay, or simply Sir, or other nickname when an operator answers the call. If not, the routine proceeds to step 417 described below. Otherwise, server 230 at step 406 asks the user to record his/her preferred salutation, and becomes receptive to the user response. The user response is recognized, e.g., by the aforementioned voice recognition device in server 230, and at step 409 entered by manager 305 in the user profile record, which is newly established if no user profile record has been established for the user. Server 230 at step 412 asks the user whether the personal salutation preference applies to the instant call only or all calls, and becomes receptive to the user response. If such a preference applies to the instant call only, the profile entry is marked "temporary," as indicated at step 415, which is to be erased from the user profile record after the termination of the instant call. In that case, server 230 may again elicit from the user the personal salutation preference in a subsequent information assistance call by the user. However, in either case the routine proceeds to step 417. Otherwise, if the user does not have a personal salutation preference at step 406, the routine skips to step 417 as well, where server 230 asks the user whether he/she prefers a special skilled operator, e.g., a Spanish speaking operator, an operator who is local to New York City who is familiar with the New York lifestyle and local knowledge, etc. If not, the routine comes to an end. Otherwise, server 230 at step 420 provides choices of operator skills from which the user may select, and becomes receptive to the user selection. At step 423, the user selection(s) recognized by server 230 is entered in the user profile record. For example, server 230 may announce to the user in an automated voice, "press '1' if it pertains to a language skill; press '2' if it pertains to geographic region; etc. You may return to the menu for further selection by pressing '*'." Let's say the user presses "2" in this instance. Server 230 may further announce, "state the preferred geographic region by city and/or state." In response, the user may then utter "New York, N.Y." Similarly, server 230 at step 426 asks the user whether the special operator skill preference applies to the instant call only or all calls, and becomes receptive to the user response. If such a preference applies to the instant call only, the profile entry is marked "temporary," as indicated at step 429. Otherwise, the routine comes to an end.

FIG. 5 illustrates profile record 500 associated with the user in this instance. Record 500 contains user preferences including information concerning the user's subscription to enhanced services, e.g., personalized information management service option 512 maintaining the aforementioned contacts, appointments and other folders for the user. Record 500 is updated from time to time when one or more user preferences are changed, and in particular each time when the user subscribes to a new enhanced service or cancels an enhanced service subscription. In addition, record 500 in this instance indicates personal salutation preference 514 and special operator skill preference 516 specified by way of the above-described routine of FIG. 4.

Figure 6:
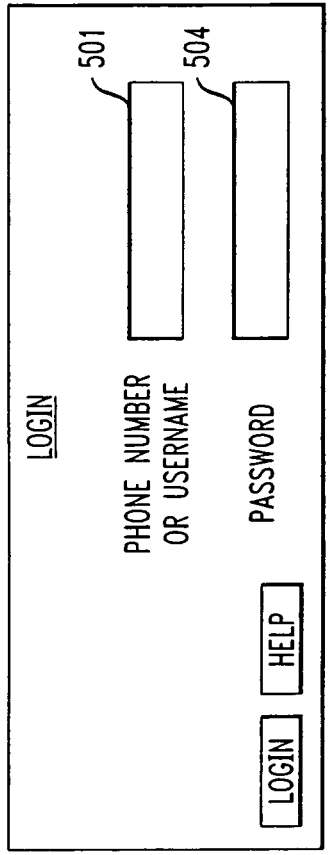
FIG. 6 illustrates a Login graphical user interface (GUI) in accordance with the invention.

Knowing from record 500 that the user is a subscriber to the personalized information management service, computer 228 communicates the received ANI to personalized information server 28 through WAN 30 (or alternatively Internet 121). In response, server 28 presents a Login graphical user interface (GUI) on terminal 120, at which an operator is currently attending to the user's information assistance call. FIG. 6 illustrates such a GUI where the operator is prompted to enter the user's phone number or username to identify the user, and a password to verify that the user is authorized to access the personalized information management service. It will be appreciated that other user identifying information, e.g., a personal identification number (PIN), his/her mother's maiden name, etc. may be used for verification purposes as well.

It should be noted at this point that the user identification and password are established beforehand through a registration process. For example, to subscribe to the personalized information service, the user can call an operator at the designated access number. As part of the registration, the operator enters in a user data record on server 28 the user identifying information including username, password, and telephone number of the particular telecommunication device, e.g., a wireless telephone in this instance, which the user would use to call the information assistance service in the future. It is particularly advantageous to use such a phone number (also known as a mobile directory number (MDN) in the case of a wireless phone number) to identify the user since, as described before, the calling number would be automatically captured as an ANI at information/call center 200 when the user calls.

Thus, the ANI of the user is automatically provided in entry 501 of the Login GUI by server 28, thereby obviating the need of the operator's eliciting from the user, and entering, the required phone number or username. At entry 504, the operator enters the password provided by the user to complete the login process. In the event that the ANI is not automatically available, or where the user is accessing the subject service from an unknown point or the operator suspects that the user calls from a phone number other than the registered phone number, the operator may verify/obtain the necessary identifying information with/from the user. For that matter, in an alternative embodiment, the user data record may also contain biometric measures for user identification, e.g., "voice prints" of the user, which may be derived from a recording of the user uttering a pre-selected code(s) (e.g., PIN) or word(s) (e.g., password) during the registration process. In that embodiment, when the user subsequently attempts to access the personalized information service, the user needs to utter the pre-selected code(s) or word(s). Only when his/her utterance corresponds to the stored voice prints, should he/she be allowed the service access.

The login information is transmitted to server 28, where it checks the aforementioned user data record to verify the received information. After it is verified, server 28 identifies from the user data record all of the folders including contacts folders and appointments folders associated with the login information (e.g., the ANI), and any user's access rights thereto. For example, for each folder, the user may have the predesignated rights to view, edit, administer, and/or delete the folder. Server 28 presents to terminal 120 a Home GUI, listing all such folders associated with the ANI and thus the user.

Figure 7:
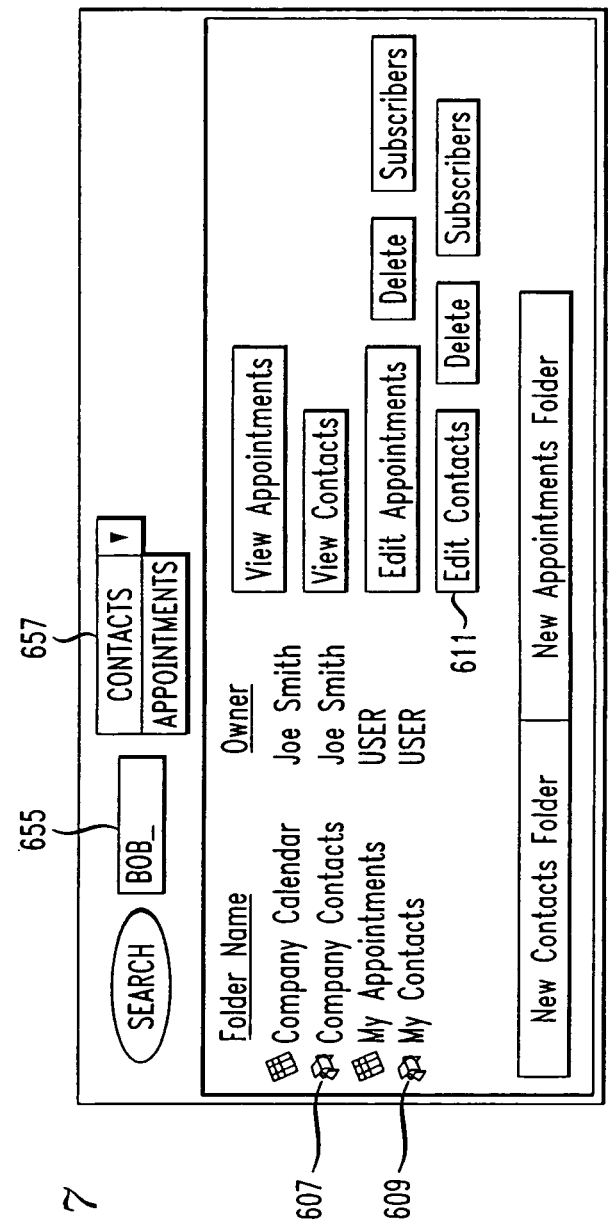
FIG. 7 illustrates a Home GUI in accordance with the invention.

FIG. 7 illustrates such a Home GUI, which lists, among others, contacts folders 607 and 609 designated "Company Contacts" and "My Contacts," respectively. The operator can access each contacts folder, and manage the contacts information in the folder for the user, subject to the user's access rights thereto. For example, the user in this instance has the predesignated right to view the content of Company Contacts folder 607 only. On the other hand, he/she has the additional right to edit the content of My Contacts folder 609.

FIG. 8 illustrates a GUI showing the content of My Contacts folder 609 when, say, Edit Contacts option 611 is selected. As shown in FIG. 8, for each contact, e.g., Bob, his/her name, home phone number, business phone number and mobile phone number, if any, although additional information concerning the contact, e.g., his/her postal and electronic mail addresses, may be available but is not displayed for lack of room. For that reason, a More option, e.g., option 705, is provided for selection to present the additional information on a separate screen.

In addition, for each contact an Edit option, e.g., option 707, is provided to edit the contact information. For instance, when option 707 is selected, server 28 returns another GUI, which is illustrated in FIG. 9. At this GUI, different fields concerning the contact Bob, e.g., his name, company name, company address, phone numbers, facsimile numbers and pager numbers are presented, and each field may be modified by overwriting any existing information therein.

It should be noted that to protect privacy of certain information about a contact, e.g., his/her home phone number, an owner or administrator of folder 609 is afforded Private options, e.g., option 807, to designate certain contact information private. Accordingly, server 28 exercises censorship on contact information in a folder based on any privacy protection previously imposed by the owner or administrator of the folder. As shown in FIG. 9, the privacy protection is on an element by element basis. For example, Private option 807 in this instance is selected to keep Bob's home phone number private while the Private option for his business number is unselected, which is therefore unprotected from the public. Thus, in this instance, a read-only subscriber to folder 609 who is not privy to Bob's home phone number may learn his business number. As a result, when a read-only subscriber views a listing of the contacts including Bob in folder 609, his home phone number is replaced by a "Private" notice.

In accordance with an aspect of the invention, the read-only subscriber to folder 609 may still be connected to Bob's home phone number by the operator, but will not be provided with the number dialed. To that end, after the read-only subscriber calls an operator and requests to be connected to Bob, the operator goes through the similar Login and Home GUIs which however pertain to the read-only subscriber. By utilizing the search engine described below, the operator uncovers listing 912 in a View GUI illustrated in FIG. 10.

It should be noted that this View GUI which is made available to a read-only subscriber (represented by the operator in this instance) to folder 609 is similar to the Edit GUI of FIG. 8 which is made available to an owner or administrator of the folder. However, the two GUIs differ from each other in that unlike the Edit GUI, the View GUI lacks Edit options since a read-only subscriber to folder 609 does not possess edit rights. In addition, Bob's home number, designated private, is revealed on the Edit GUI to the owner or administrator of folder 609, but not on the View GUI. Thus, in this instance, the operator is faced with the same "Private" notice in lieu of Bob's home phone number on the View GUI as would be the case if the read-only subscriber accesses the View GUI on his/her own. In order to connect the read-only subscriber to Bob's home number, the operator at terminal 220 signals switching matrix platform 203 to place the read-only subscriber's call on hold, and selects the "Private" notice. This selection causes an identification (ID) of the subscriber's connection which is on hold, and a request for Bob's home number in folder 609 to be sent to server 28. In response to such a request, server 28 retrieves Bob's home number in folder 609 from database 20, and transmits another request for connecting the subscriber to the retrieved phone number to switching matrix host computer 228 via WAN 30. This request includes the aforementioned subscriber's connection ID. Under control of computer 228, platform 203 then calls Bob's home phone number to establish a connection thereto. Once the new connection is established, computer 228 causes platform 203 to bridge the subscriber's connection identified by the received ID to the new connection, thereby connecting the subscriber to Bob's home number, without disclosing the number to the subscriber, or the operator for that matter.

In an alternative embodiment, the operator plays an active role before the subscriber's connection is bridged to the connection to Bob's home number. In this embodiment, the operator obtains from the user data record the subscriber's name as registered. However, the operator may also verify the subscriber's name with the subscriber verbally before putting the subscriber's connection on hold. As soon as platform 203 establishes the connection to Bob's home number, the operator is afforded an option to ask Bob over the newly established connection whether Bob wants to talk to the read-only subscriber. If Bob accepts the call, the operator signals host computer 228 to cause platform 203 to bridge Bob's connection to the subscriber's connection, thereby connecting the subscriber to Bob's home number. Otherwise, if Bob declines to talk to the read-only subscriber, the operator informs the subscriber of the declination and causes platform 203 to terminate (or tear down) both connections with Bob and the subscriber.

In another alternative embodiment, voice server 230 takes the place of the operator in asking Bob whether he wants to answer the subscriber's call. That is, before the subscriber's connection is bridged to Bob's connection, voice server 230 seizes Bob's connection and announces in an automated voice, over the connection, an arrival of the call from the subscriber who is identified by his/her registered name. After learning the identity of the subscriber, Bob is afforded a choice to accept the call by pressing a first predetermined key on his telephone. The resulting DTMF signal causes platform 203 to bridge the subscriber's connection to Bob's connection. Otherwise, Bob may press a second predetermined key to reject the call. The resulting DTMF signal causes (a) voice server 230 to announce to the subscriber, through the subscriber's connection, Bob's declination to answer the call, and (b) platform 203 to terminate both Bob's and the subscriber's connections.

In yet another alternative embodiment, the screening of the subscriber's call is achieved by using an improved caller ID (CID) feature in accordance with the invention. Traditionally, by subscribing to a CID service and utilizing a CID receiver, which may be integrated into a telephone, a called party between phone rings may receive display CID information on the receiver which includes the originating telephone number, name associated with that number, date and time of the call. One such receiver for receiving CID information is described, e.g., in U.S. Pat. No. 4,582,956 issued to Doughty on Apr. 15, 1986.

The CID information is transmitted from a switching office connected to the called party's CID receiver using frequency shift keyed (FSK) modem tones. These FSK modem tones are used to transmit the display message in ASCII character code form. The transmission of the display message takes place between the first and second rings of the called station. The CID data format and transmitter are described, e.g., in U.S. Pat. No. 4,551,581 ("the '581 patent") issued to Doughty on Nov. 5, 1985. As described in the '581 patent, the data format of each message to be sent to the called station is preceded by the specification of the type and length of the message. For example, for the first message concerning the originating number, the first character sent is the message type which specifies that the ensuing message is an originating number. The second character represents the length of the message. After the message length character are characters which represent the digits of the originating number. Additional messages follow the same data format (i.e., type character, length character and message content in that order). The formatted messages are followed by a checksum or other error detection character which is used to detect errors which may have been introduced in the transmission.

However, we have recognized a few disadvantages of using the traditional CID service. For example, any name which appears in the CID alongside the originating telephone number identifies the telephone service subscriber to that number, and which is registered by a telephone carrier in a directory database, also known as "white pages." Telephone carriers typically have directory listings of wireline telephone service subscribers but currently lack the listings of wireless telephone service subscribers. As a result, when a caller uses a wireless telephone to call a called station, the CID receiver at the called station typically displays the wireless telephone number, but not the name of the associated telephone service subscriber because of a lack of the white pages information. As such, the traditional CID service is ineffective in screening wireless calls by the callers' name.

Return now to the above example where the caller, who is a read-only subscriber to contacts folder 609, asks an operator to connect him/her to Bob's home number which is indicated "Private" in the folder. Not to be confused with a telephone service subscriber, the folder subscriber in this example will now be referred to simply as the "caller." When the caller calls the operator for connecting him/her to Bob's home number, the ANI associated with the caller's call is communicated to center 200 which, as mentioned before, is derived by platform 203 from the call set-up signals. In accordance with an aspect of the invention, the white pages information associated with such an ANI is provided as CID data to Bob for call screening purposes. To that end, host computer 228 provides the ANI to database server 226 to look up the corresponding white pages information. It should be noted that unlike a typical telephone carrier, call/information center 200 in this instance has access to directory listings of both wireline and wireless telephone service subscribers. Thus, based on the received ANI, server 226 locates the directory listing including the name of the telephone service subscriber associated with the ANI. While the connection with the caller is on hold, and the second connection to Bob's home number is being established, host computer 228 in accordance with the invention communicates, as part of the call set-up procedure, the ANI and associated telephone service subscriber name to the called station (i.e., Bob's telephone) as the CID data. Specifically, such ANI and associated telephone service subscriber name are formatted in the well known CID data format and communicated, pursuant to an agreed-upon protocol, to the aforementioned data transmitter in the switching office connected to the called station.

FIG. 11 illustrates the ANI and associated telephone service subscriber name in the CID data format. As shown in FIG. 11, type character 715 specifies that the ensuing message contains the telephone number of the calling station from which the caller calls the operator. Length character 718 specifies the length of such a telephone number. Message field 721 contains the actual telephone number of the calling station, i.e., the ANI. In addition, type character 724 specifies that the ensuing message contains the telephone service subscriber name associated with the telephone number in field 721 according to the directory listing. Length character 727 specifies the length of such a name. Message field 730 contains the actual telephone service subscriber name. Following field 730 is checksum field 733 for detection of transmission errors.

In a well known manner, the data transmitter in the switching office transmits the CID data between rings of the called station, which is displayed on the called station or other connected device for receiving such CID data. As soon as the connection to the called station is established, host computer 128 causes platform 114 to bridge the new connection to the caller's connection which is on hold. Bob may then review the resulting CID display information at the called station before he decides to answer the call or not.

However, we have recognized that in the above example, the caller may not always be the same as the telephone service subscriber to the originating number because the caller may have borrowed another person's telephone to call. As a result, the CID message indicating the name of the telephone service subscriber may be misleading in identifying whom the caller is. Thus, in accordance with a second aspect of the invention, after obtaining the white pages information based on the ANI in the above example, the operator checks the name associated with the ANI in the directory listing against the caller's name as registered on the user data record. If they do not match, the operator may assume that the caller's name from the user data record is valid as the associated password of the caller was verified in the earlier login process. However, the operator may also verify the caller's name with the caller on the phone. The operator then enters the actual caller's name on terminal 220, which replaces the telephone service subscriber name in the CID data to be transmitted to the called station. FIG. 12 illustrates the resulting formatted CID data, which differs from that of FIG. 11 in that type character 741 and length character 743 in FIG. 12 correspond to the caller's name, as opposed to the telephone service subscriber name. In addition, message field 745 contains such a caller's name.

We have also recognized that with the caller's name ascertained in the above example, the calling station number in the CID data serves no additional identification purpose. However, it may provide a means for the called party to return the caller's call. For instance, upon reviewing the CID display information, Bob may decide not to answer the call immediately as he is unavailable or currently on another call. Bob may try to contact the caller later using the display calling station number. Nevertheless, by the time when Bob calls, the caller may not be at that number, or the caller may want Bob to return his/her call at a different number or by a different method of communications altogether, e.g., facsimile, email or SMS. Thus, in accordance with a third aspect of the invention, the operator may query the caller on the phone for methods of returning his/her call in case Bob does not answer the call immediately. In this instance, let's say the caller wants Bob to return his/her call using a telephone number different from the current calling number, or via facsimile or email. In that case, the caller provides the operator with his/her desired (1) call-back telephone number, (2) facsimile number and (3) email address. Accordingly, the operator enters on terminal 220 the information concerning the call-return methods, along with the caller's name, to generate the CID data to be transmitted to the called station. The resulting formatted CID data by host computer 228 is illustrated in FIG. 13, which includes additional type character 751 and length character 753 correspond to the call-back telephone number, which is contained in message field 755; type character 757 and length character 759 correspond to the caller's facsimile number, which is contained in message field 761 and may be preceded with "F-" to be distinguished from a telephone number; type character 763 and length character 765 correspond to the caller's email address, which is contained in message field 767. Of course, the time period for which each method of communications is the most convenient to the caller may also be specified in the CID data.

Further, we have recognized that the caller's name in the CID display may not be sufficient information for the called party to decide to answer the call. The purpose of the call, or the subject of the call may be important as well. For instance, Bob in the above example would answer the call if it concerns a business meeting the next day whereas he would not if it concerns an upcoming social event, even though the caller is the same in each case. Thus, in accordance with a fourth aspect of the invention, the operator, when querying the caller for the call-return methods, may also query the caller for the purpose or subject of the call, or other CID message to be shown to Bob. For example, the caller may want to confirm the meeting with Bob at 10 a.m. tomorrow. In that case, a CID message such as "See you tomorrow at 10" is sufficient to confirm the meeting. In implementation, the CID message may be abbreviated to accommodate the limited number of characters allowed. Thus, upon reviewing such a CID message while the called station is ringing, Bob may choose not to answer the call if he is satisfied with the message, or to pick up the call if he wants to talk to the caller, e.g., to change the meeting schedule or for whatever reasons. Thus, in this illustrative embodiment, the operator also enters on terminal 120 the call-content attribute of the call (e.g., information concerning the call purpose or subject), or any desired message from the caller to generate the CID data to be transmitted to the called station. The resulting formatted CID data is illustrated in FIG. 14, which includes additional type character 771 and length character 773 corresponding to the call-content attribute and/or desired message from the caller, which are contained in message field 775. By reviewing the display CID information at the called station which includes the call-content attribute and/or caller's message in this instance, Bob is able to make a better informed decision whether to answer the call.

In accordance with another aspect of the invention, the user may subscribe to or opt out the above-described CID service. The subscription to or opting out the CID service may be specified in user profile record 500. For example, referring to FIG. 5, caller-ID service option 520 in this instance is unselected, indicating its opt-out status.

Referring back to FIG. 9, the above-described concept of protecting privacy of listing, information on an element-by-element basis is applicable not only to contacts folders here, but also generally to white pages, wireless telephone directories, enterprise directories and other public directories. In particular, all wireless telephone numbers currently are unpublished. The disclosure of a wireless telephone number may be opted in or out, e.g., by selecting or unselecting Private option 809.

In accordance with another aspect of the invention, a selection of one such Private option (associated with wireline, wireless, or other user telephone number) may lead to queries for desired privacy features. For example, the user may choose to disclose the telephone number during certain times (e.g., daytime, weekdays), and no other telephone number or a second telephone number during other times (e.g., nighttime, weekends). In addition, the user may create a "blackout list," listing those entities (by their names and/or telephone numbers) which are unauthorized to obtain the user telephone number. In that case, for example, the blackout list may be stored in database 20 in association with the user telephone number. When a caller calls the information assistance service to access the user telephone number, the service provider may retrieve the user telephone number, along with the associated blackout list. The service provider may then screen the caller to determine whether the caller is authorized to access the user telephone number. Such screening may be conducted manually by an operator where the operator may check the ANI associated with the call against the blackout list, or may simply ask for the caller's name, his/her company name, or other affiliation information, and check the received identity information against the blackout list. The screening may alternatively be conducted by computer 228 in an automated manner where upon learning the ANI associated with the call, computer 228 checks the ANI against the telephone numbers on the blackout list.

In another embodiment, the user may provide the caller a personal identification number (PIN) beforehand, which is required to be produced by the caller during an information assistance call to access the user telephone number. Like the aforementioned blackout list, the PIN may be stored in database 20 in association with the user telephone number. The PIN may similarly be verified by the information assistance service provider manually or in an automated manner before the caller can access the user telephone number. Further, the user may have multiple PINs associated with different privacy levels, respectively. Each privacy level is used to qualify the restriction of access to listing information. For example, a first PIN is associated with privacy level 1, production of which by a caller during an information assistance inquiry may enable the caller to access the user's business telephone number; a second PIN is associated with privacy level 2, production of which by a caller during an information assistance inquiry may enable the caller to access the user's home phone number in addition to his/her business telephone number; a third PIN is associated with privacy level 3, production of which by a caller during an information assistance inquiry may enable the caller to access the user's wireless telephone number in addition to his/her business telephone number and home phone number; and so on and so forth. Thus, with the above inventive privacy measures, the information assistance service provider advantageously serves as a clearing house to allow proper parties to access appropriate portions of listing information.

Referring back to FIG. 7, a search engine is provided on a Home GUI to search for a listing of a desired contact. For example, the operator may specify at entry 655 a search term (e.g., Bob), and select at entry 657 the type of folder (e.g., contacts or appointments) in which the search term is to be found. Thus, by using such a search engine, an informal request without much information, such as "I need to reach Bob" and "I want to talk to the sales manager at ABC Corporation" is sufficient for the operator to locate the requested contact information. After initiating the search by clicking on the "Search" button, any listing satisfying the search query is highlighted. In this instance, a search on the name "Bob" in a contacts folder uncovers listing 112 in the Edit GUI of FIG. 8.

Figure 15:
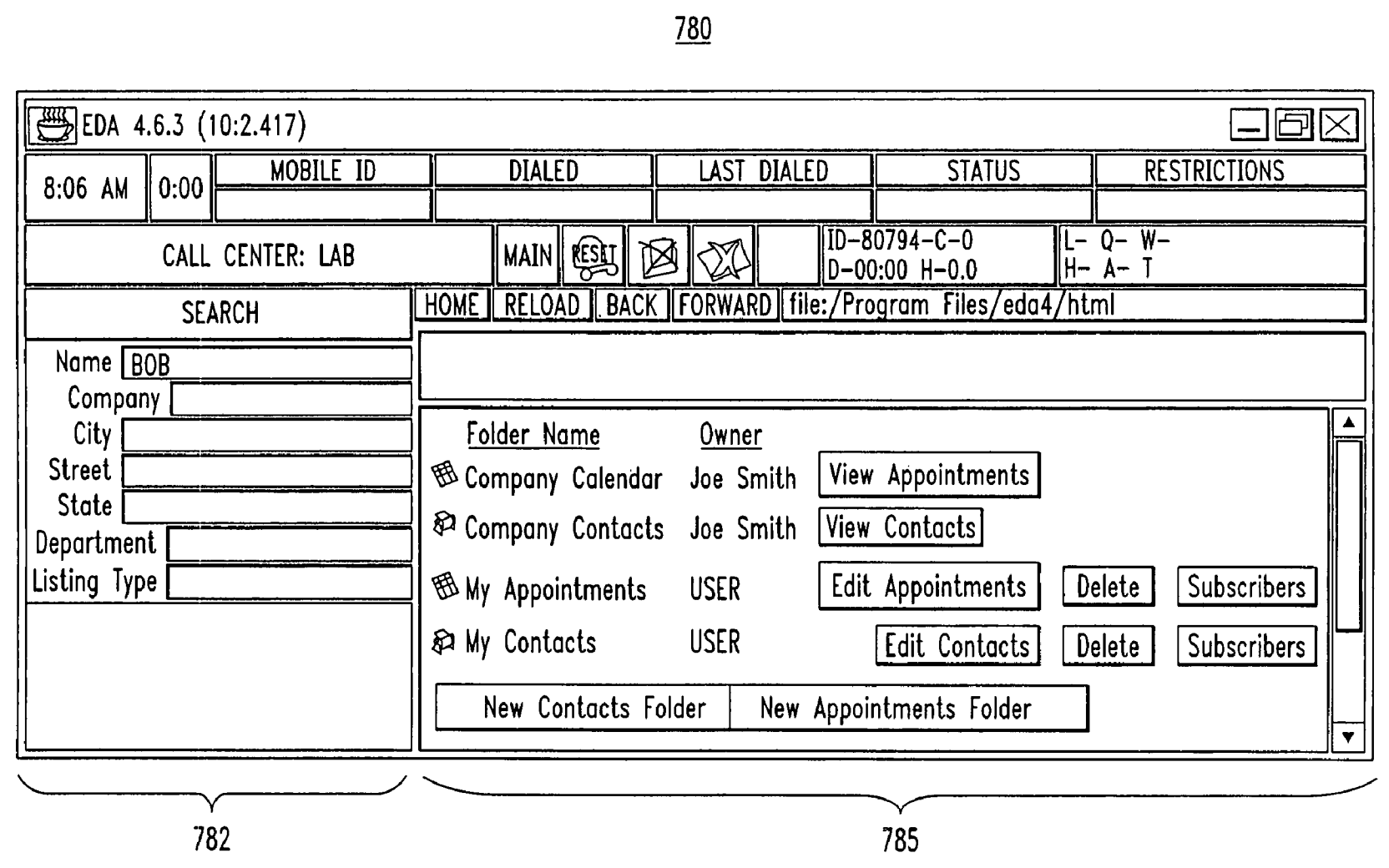

It is anticipated that when given more specific data about the desired contact, e.g., Bob's full name, the operator may also search such other directory databases as public national directory databases, enterprise directory databases (e.g., corporation directory databases, and university directory databases), etc., accessible by database server 226. To that end, GUI 780 in FIG. 15 is designed for the operator to perform such a combined search. As shown in FIG. 15, section 785 of GUI 780 corresponds to the Home GUI of FIG. 7, which allows the operator to manage contacts and appointments folders for the user as described before. In addition, section 782 provides the interface for the operator to perform the combined search for desired contact information.

Thus, in this example, when a user requests a listing of a desired party, say, Bob, the operator invokes GUI 780 on terminal 220. The operator enters at search section 782 the name Bob and any other information provided by the user to the best of his/her ability such as Bob's last name, the name of the company at which Bob works, his or his company's address, etc. In response to, no, or one or more search results meeting the user's request are returned from database server 226 accessing a public national directory database and enterprise directory databases in this instance, and/or from personalized information server 28 accessing folders 607 and 609 associated with the user. Each returned listing in this instance includes a source indicator indicating its provider, i.e., database server 226 or personalized information server 28. If multiple Bob listings are returned, the operator in a conventional manner discusses the listings with the user to ascertain the desired Bob listing. When the desired Bob listing is ascertained and selected by the operator for later possible connection to the listed telephone number for the user, and incorporation into one or more contacts folders associated with the user before the process ends.

Continuing the above example, upon learning the desired Bob listing, the operator offers the user an option to be connected to Bob's telephone number. If the user exercises such an option, the operator then initiates an outgoing call for the user by seizing an outgoing voice channel from a T1 communication link 214 and outdialing the desired telephone number. Outdialing is a function of platform 203, whereby platform 203 transmits the desired telephone number after it is entered. Host computer 228 is notified of the outgoing call and automatically instructs platform 203 to apply a CPA therein to the outbound channel and a DTMF receiver to the inbound channel after outdialing. Such a CPA is sensitive to, and capable of identifying, telephone connection status conditions and signals including ring tone, busy, reorder, PBX intercept, SIT intercept, vacant code, reorder-SIT, no circuit LEC, reorder-carrier, no circuit-carrier, dial tone, continuous on tone, and silence. Platform 203 afterwards connects the user on the inbound channel to the outgoing call on the outbound channel.

The CPA monitors the outgoing call on the outbound channel for a predetermined number of rings, a predetermined amount of time, or until a specified connection status is detected. A successful call, in which the destination telephone is answered, is recognized by platform 203. Illustratively, platform 203 identifies a successful call by detecting, on the outbound channel, the bit transition that occurs when the destination telephone converts from an on-hook status to an off-hook status. The detection of a successful call is relayed t6 host computer 228 by platform 203.

When an outgoing call is successfully completed, platform 203 remains passively connected to the call. When the destination telephone is disconnected, platform 203 detects another bit transition indicating that the destination telephone changed from off-hook to on-hook. In response, platform 203 removes the application of the CPA on the outbound channel. Voice server 230 then seizes the connection to user telecommunication device 244 to provide additional information and services to the user upon closing of the call, in accordance with another aspect of the invention. However, such additional information and services may alternatively be provided by voice server 230 in the beginning, or at other appropriate stages, of the call. In this instance, upon the call closing, the user is allowed to order new services, modify user profile record or request other actions. To that end, server 230 describes any new service feature which is made available to the user by the information assistance service provider. The description may be followed by a menu, including options selectable by pressing specified keys on device 244. Alternatively, the user's selection is spoken into device 244, which is received and recognized by a voice recognition device in voice server 230. For example, pressing the "1" key enables the user to adopt the new service feature; pressing the "*" key enables the user to speak to an operator to obtain further information about the new service feature; and pressing the "2" key enables the user to skip to the next service feature description, if any. In this instance, upon detection of a depression of the "1" key by the user, voice server 230 invokes a submenu for the user to enter any necessary information to subscribe to the new service feature. User profile record 500 may then be updated to reflect the new service feature subscription.

After the new service feature description(s) and menu, voice server 230 may invoke an action menu to allow the user to perform or request other actions. For example, pressing the "*" key enables the user to be re-connected to an operator for further information assistance; pressing the "7" key enables the user to modify user profile record 500, e.g., through the agency of an operator, or a submenu to go through the profile entries item by item and make the necessary changes; pressing the "#" key enables the user to hear a recitation by voice server 230 of the desired destination telephone number just inquired; pressing the "8" key enables the user to incorporate the desired listing just inquired in a contacts folder associated with the user; etc. In this instance, the user's pressing the "8" key results in incorporating the desired listing into My Contacts folder 609, stemming from the fact that the user here has the aforementioned rights to edit My Contacts folder 609 only but not Company Contacts folder 607. Otherwise, if the user has the rights to edit multiple contacts folders, the folder involved in the incorporation needs to be specified by the user, e.g., in profile record 500 or upon request. In general, the incorporation is carried out pursuant to a predetermined protocol whereby the desired listing when incorporated would be properly formatted in folder 609.

We have recognized that based on information in user profile record 500, e.g., personal interests 540, the user may be targeted to receive certain advertising or promotional (e.g., schedules, coupons, discounts, etc.) information. For example, after (or before) an information assistance call, such targeted promotional information may be "pushed" to the user, subject to any opt-out provision in the profile. For example, the user in this instance specifies as part of personal interests 540 preferred music, e.g., Beatles, Rolling Stones, etc.; fashion, e.g., Versace, Donna Karen, etc.; and sports Events, e.g., Knicks basketball games, PGA Golf tournaments, etc., for which the user would like to receive information from time to time. In accordance with an aspect of the invention, based on the profile data, server 28 tailors the content of the promotional information delivered to the user to suit his/her interests as soon as the information becomes available. In particular, at the closing of the information assistance call, voice server 230 provides the targeted promotional information to the user. For example, voice server 230 at such time may inform the user of the schedule of upcoming Knicks games and a sale of Knicks merchandise. Voice server 230 may then prompt the user to reserve tickets for any desired games and purchase any desired merchandise through a concierge-type service also provided by information assistance service provider 205.

In accordance with another aspect of the invention, the targeted promotional information may also be provided as a message to the user from time to time via SMS, e-mail, voicemail, facsimile, paging, instant messaging, etc. For example, the actual method(s) of delivery of the targeted promotional information may be specified by the user in user profile record 500, shown as information delivery method preferences 550. Such information delivery method(s) may be established in the initial service registration by the user in response to such direct questions as "How do you want promotional information to be transmitted to you from an information assistance service?" The answers to such direct questions may make up preferences 550. The specified delivery methods may be prioritized in accordance with the user's preferences. Of course, the user is allowed to opt out one or more of the above targeted advertising service features.

Server 28 from time to time sends to profile gateway 231 the targeted promotional information to be delivered to the user. Gateway 231 generates a message containing the promotional information, and data concerning delivery methods ranked in the order of the user's preferences, as specified in profile record 500. This message is sent to profile manager 305, which in response generates an appropriate request to messaging server 307 for delivery of the targeted promotional information.

In this instance, messaging server 307 may be situated at the same location as profile manager 305. Server 307 serves as a gateway for delivering information to a user, e.g., via voicemail, SMS, e-mail, paging, facsimile, wireless application protocol (WAP), web, etc. When it is determined that the promotional information needs to be delivered via one of these communications, profile manager 305 forwards the necessary content and addressing information (e.g., voicemail access number, wireless telephone number for SMS, e-mail address, pager number, facsimile number, uniform resource locator (URL) of a WAP or web site, etc.) to messaging server 307. Messaging server 307 attempts a delivery of the promotional information via the appropriate method of delivery, and feeds back to profile manager 305 information about the delivery status. For example, in the event that a first preferred delivery method is not successful, server 307 informs manager 305 of the unsuccessful delivery status. In response, manager 305 may cause server 307 to attempt the delivery via a second preferred delivery method, and so on and so forth.

For example, where the targeted promotional information is delivered to a WAP or web site, the access (e.g., URL) to one such site may be provided, e.g., on the user's bill for the information assistance service. Similar to the Internet standards, WAP specifies use of a wireless markup language (WML), which is a subset of an extensible markup language (XML), for writing WAP content. WML is designed to make optimum use of a small display which is typical of a mobile device, e.g., wireless telephone, PDA, etc. The resulting WAP content is scalable, e.g., from a two-line text display to a full graphic screen of a larger display. The WAP content can be read by a user using WAP microbrowser software installed in the mobile device. The communications between the mobile device and the Internet is through a WAP gateway, which serves as an interface between a wireless network and the Internet.

The WAP gateway provides the necessary protocol translation (e.g., between WAP and transmission control protocol/Internet protocol (TCP/IP)) and optimization, security, activity tracking and administration. Messages communicated between a mobile device and the WAP gateway are in accordance with a WAP datagram protocol (WDP). For example, when a request from the mobile device which comprises a URL is sent via a wireless network to the WAP gateway, the request includes a device ID identifying the mobile device. In response, a hypertext transfer protocol (HTTP) interface in the gateway retrieves the requested content from the WAP site on the Internet at the URL. The retrieved content is converted into a compressed data format for transmission over the wireless network to the mobile device identified by its device ID. The WAP microbrowser software in the mobile device interprets the compressed data and displays the interactive WAP content. In this instance, the user's bill may provide the user with the URL of the WAP site for accessing the aforementioned promotional information, expressed in WML.

Similarly, the targeted promotional information may be expressed e.g., in HTML or XML, and placed on a website for the user to access anytime using a device running the necessary web browser software. The particular URL of the website may be designated to the user exclusively for his/her personal consumption.

Continuing with the above example, if the outgoing call to the destination telephone cannot be successfully completed, e.g., the call status condition of the outgoing call identified by the CPA as a busy signal, platform 203 terminates the outgoing call by releasing the outbound channel, with the inbound channel intact. In this case, like the previous successful call completion case, voice server 230 may similarly present the above-described new service feature descriptions, menus and targeted promotional information (collectively "user assistance and service information") to user telecommunication device 244. However, the user here may be afforded additional action menu options, e.g., an option to have platform 203 attempt the same destination telephone number again by pressing the "1" key, and another option to record a message for later delivery to the destination party by pressing the "2" key.

Voice server 230 may similarly present the user assistance and service information to user communication device 244 in the event that the call status condition of the outgoing call is detected by the CPA in platform 203 as a ring-no-answer condition. Under that condition, it is desirable to allow sufficient time for the destination party to answer the call, but yet also provide the user with the user assistance and service information, other than simply waiting continuously for an answer. At the same time, the ring tone on the outbound channel may be temporarily muted or its volume is temporarily reduced. In addition, voice server 230 may communicate, through the inbound channel, the user assistance and service information while the user is waiting. If the user chooses to do nothing and wait, the ring tone continues until the destination telephone is answered, or the user disconnects.

In the event that the call status condition of the outgoing call is identified as a communication problem, e.g., reorder, PBX intercept, SIT intercept, vacant code, reorder-SIT, no circuit LEC, reorder-carrier, no circuit-carrier, dial tone, continuous on tone, or silence, voice server 230 informs the user of the communication problem. In addition, voice server 230 may present to user communication device 244 the user assistance and service information described above.

In addition, the user when interacting with the information assistance service may prefer to use certain key or voice commands, over those suggested, e.g., in the menus. This may stem from the fact that it is easier for the user to remember those certain key or voice commands, and to consistently apply the same commands for the same frequently used functions. Thus, in accordance with another aspect of the invention, the user is allowed to create his/her own "dictionary," denoted 560, in user profile record 500 to customize his/her own "vocabulary" or reconfigure commands for interacting with the information assistance service. System components (e.g., platform 203, computer 228 and voice server 230) of information/call center 200 are programmed to look up the dictionary to understand the user's customized commands to seamlessly provide the information assistance service. In this particular illustrative embodiment, dictionary 560 is realized as a look-up table, denoted 565, for translating customized commands to corresponding menu commands recognizable by the system components. In this instance, the menu commands which have been reconfigured include the "*" key command for returning to an operator during an information assistance, and the "#" key command for providing the desired destination telephone number. As illustrated in table 565, the "*" key command has been replaced by a "0" key command preferred by the user, and the "#" key command has been replaced by a voice command "Number Please" preferred by the user.

The foregoing merely illustrates the principles of the invention. It will thus be appreciated that those skilled in the art will be able to devise numerous other arrangements which embody the principles of the invention and are thus within its spirit and scope.

For example, the invention equally applies regardless of whether feature group D (FGD) type signaling, SS7 out-of-band signaling or other signaling is used for communications between carrier switches and switching matrix platform 203 of FIG. 2A.

Figure 16:
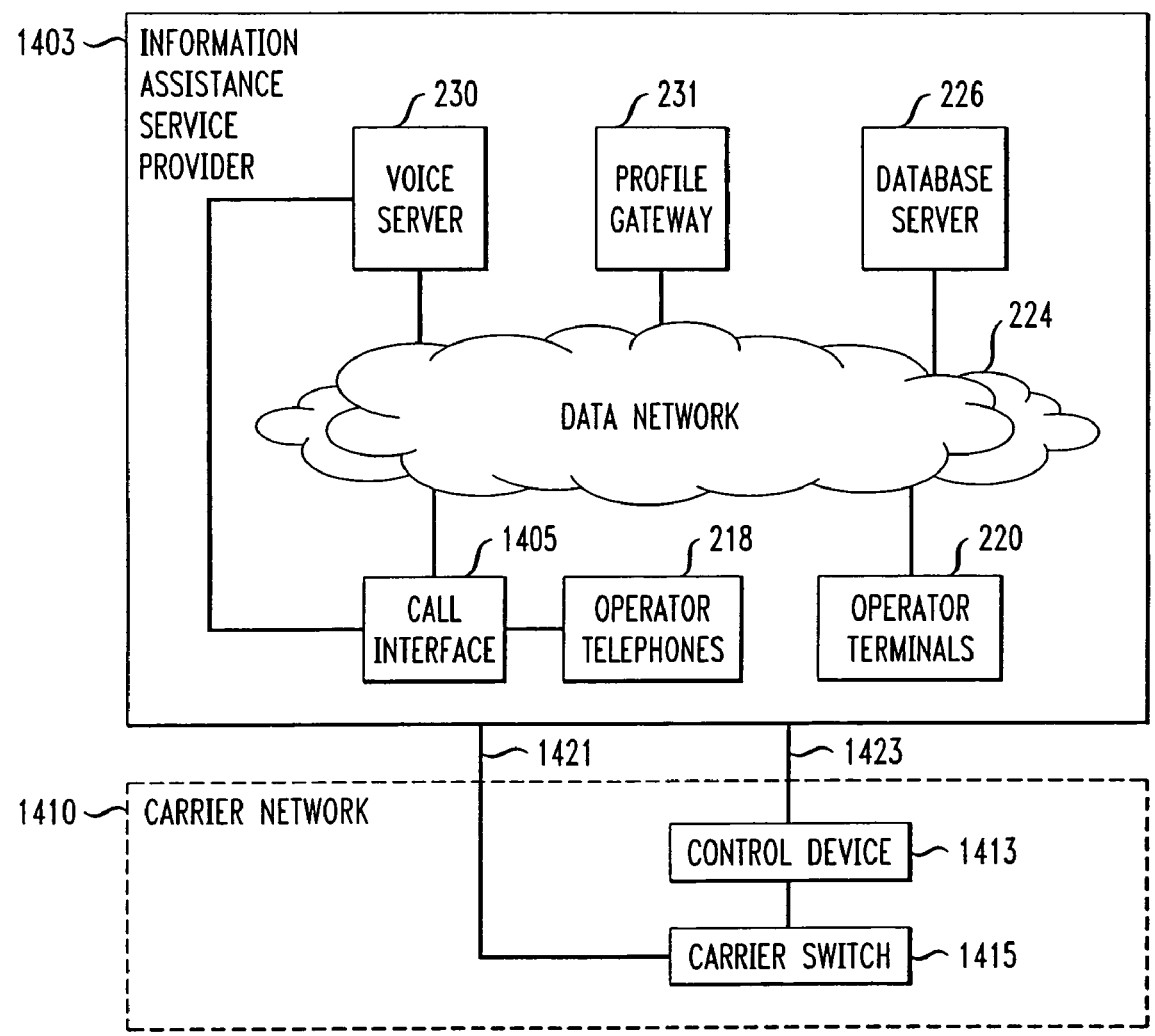
FIG. 16 illustrates an alternative information/call center configuration.

In addition, information/call center 200 may be configured differently from the above-described configuration. FIG. 16 illustrates an alternative information/call center configuration. As shown in FIG. 16, the alternative system has call interface 1405 in information assistance service provider, which is no longer connected to servicing platform 210. The functionality of platform 210 principally is carried out in carrier network 1410 in the alternative system. In fact, control device 1413 in network 1410 performs similar functions to host computer 228, and carrier switch 1415 performs not only its conventional carrier switching functions, but also those of switching matrix platform 203 described before, under control of device 1413. In this alternative system, an information assistance call is recognized by control device 1413 when it is routed through carrier switch 1415. Device 1413 causes the information assistance call to be connected through one of pre-designated direct inward dial (DID) connections 1421 to provider 1403, which is received by call interface 1405 therein. Interface 1405, connected to operator telephones 218, includes the aforementioned ACD logic for distributing the call to an operator at one of telephones 218 in a conventional manner. In the event that the information assistance call needs to be connected to a desired destination number, the operator causes the destination number and a "call completion" command to be transmitted to control device 1413 via Internet connection 1423. In response, control device 1413 instructs switch 1415 to connect the instant information assistance call to the received destination number. As per the instructions, switch 1415 completes the call to the destination number.

Finally, information/call center 200 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing information targeted to a user, comprising:
   maintaining preference data associated with the user;
   selecting information having content in accordance with the preference data;
   receiving an information assistance communication from the user, the call including a request for connection information;
   searching a database in response to the request;
   obtaining the requested connection information;
   connecting the user to a destination device based on the requested connection information;
   monitoring for a status of the connection;
   providing the selected information to the user during the connection after the status is determined; and
   providing the selected information to the user via a second communication method different from a first method used for said information assistance communication, the second communication method being specified in the preference data.

2. The method of claim 1 wherein the preference data concerns personal interests of the user.

3. The method of claim 1 wherein the selected information includes promotional information.

4. The method of claim 3, further comprising: providing to the user an option to opt out of receiving promotional information.

5. The method of claim 3 wherein the promotional information includes discount information.

6. The method of claim 3 wherein the promotional information includes coupon information.

7. The method of claim 3 wherein the promotional information includes information concerning availability of selected goods or service.

8. The method of claim 1 wherein the status indicates a completion of the call to the destination device.

9. The method of claim 1 wherein the status indicates a ring-no-answer condition.

10. The method of claim 1 wherein the status indicates a busy condition.

11. The method of claim 1 wherein the status indicates a communication problem.

12. The method of claim 1, wherein the first communication method comprises at least one communication method chosen from the group consisting of: Short Message Service ("SMS"), e-mail, voicemail, facsimile, paging, instant messaging, wireless access protocol ("WAP"), HyperText Markup Language ("HTML"), and Extensible Markup Language ("XML").

13. The method of claim 1, further comprising: providing a description of at least one service feature to the user after the status is determined; and allowing the user to modify the service to incorporate the at least one service feature during the communication.

14. The method of claim 1, further comprising: obtaining data concerning he user;
and including, by the information assistance service provider, the data in a data stream for connecting the communication to the destination device to realize a communication identification service.

15. A system for providing information targeted to a user, comprising:
storage for storing preference data associated with the user;
a server for selecting information having content in accordance with the preference data;
an interface for receiving an information assistance communication from the user, the communication including a request for connection information;
a database from which the requested connection information is obtained;
a mechanism for connecting the communication to a destination device based on the requested connection information;
a processor for monitoring for a status of the connection;
a device for providing the selected information to the user during the connection after the status is determined; and
a second server for providing the selected information to the user via a second communication method different from a first method used for said information assistance communication, the communication second method being specified in the preference data.

* * * * *